United States Patent [19]
Sauter

[11] Patent Number: 5,997,023
[45] Date of Patent: Dec. 7, 1999

[54] RETRACTABLE FOOT PEG FOR SELF PROPELLED, MULTIWHEELED VEHICLES

[76] Inventor: James H. Sauter, N10942 County Rd. G, Necedah, Wis. 54646

[21] Appl. No.: 08/855,582

[22] Filed: May 13, 1997

[51] Int. Cl.⁶ .................................................. B62J 25/00
[52] U.S. Cl. ........................ 280/291; 74/564; 297/423.22
[58] Field of Search ................................ 280/291, 288.1; 74/564; 296/75; 297/423.18, 423.19, 423.22

[56] References Cited

U.S. PATENT DOCUMENTS

| | | | |
|---|---|---|---|
| 3,794,353 | 2/1974 | Oliver | 280/291 |
| 4,797,791 | 1/1989 | Burchick | 362/72 |
| 5,524,918 | 6/1996 | Peabody et al. | 280/291 |

FOREIGN PATENT DOCUMENTS 18823 of 1903 United Kingdom ................... 280/291

Primary Examiner—Lanna Mai
Assistant Examiner—Michael Cuff
Attorney, Agent, or Firm—Roper & Quigg

[57] ABSTRACT

An extendable apparatus incorporating a support member slidably retaining at least one extension element which is biased by a tensioning means to remain in a retracted position and means for securing the at least one extension element in a position in which the overall length of the apparatus is extended. The extendable apparatus further incorporating a means for producing light and/or a means for attachment to a multiwheeled vehicle.

21 Claims, 4 Drawing Sheets

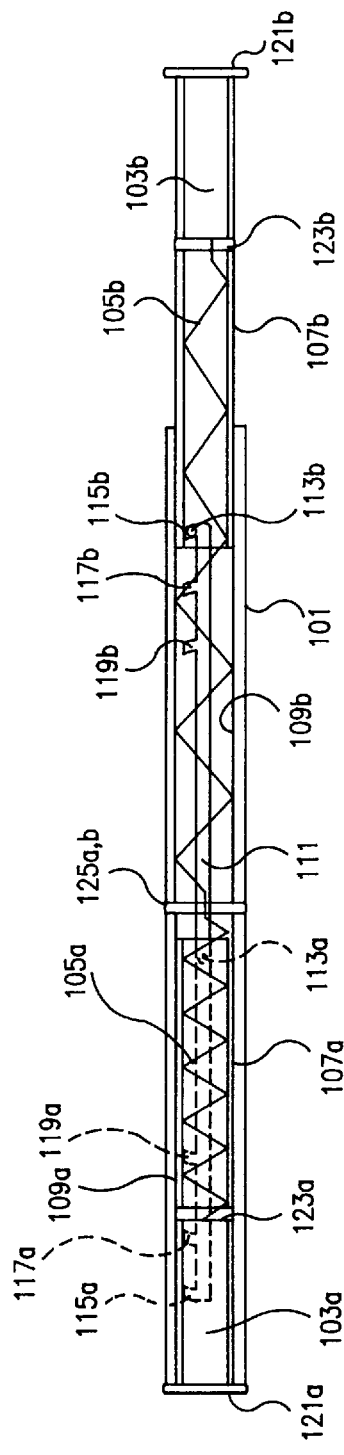
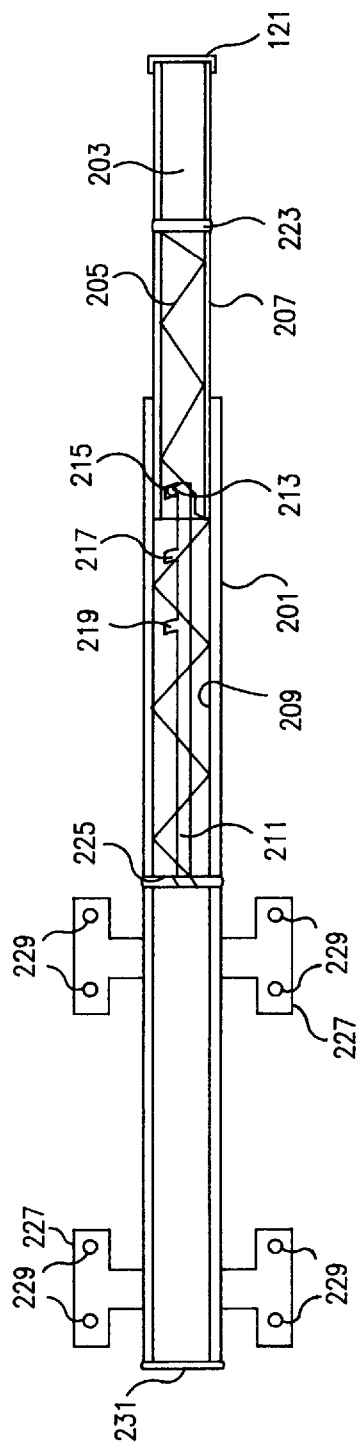

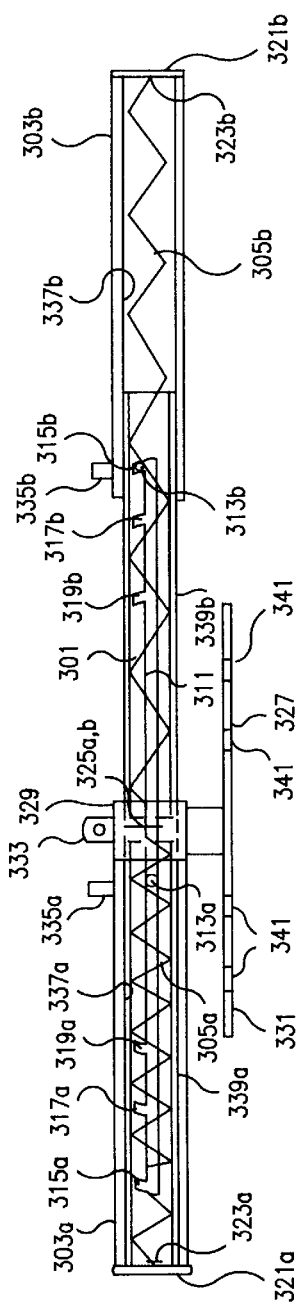
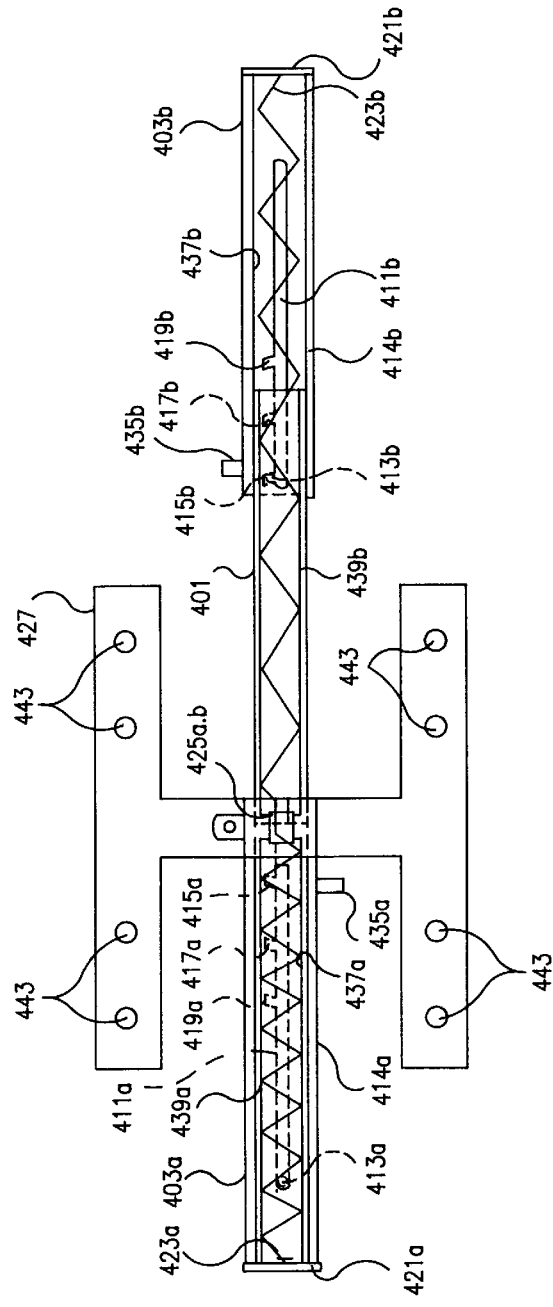
FIG. 3
FIG. 4

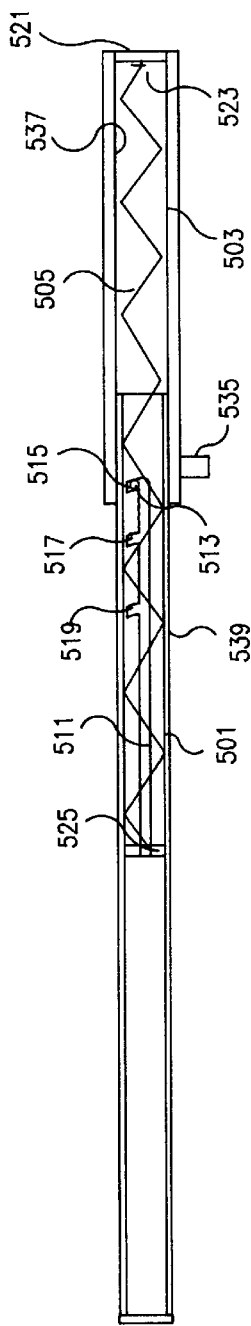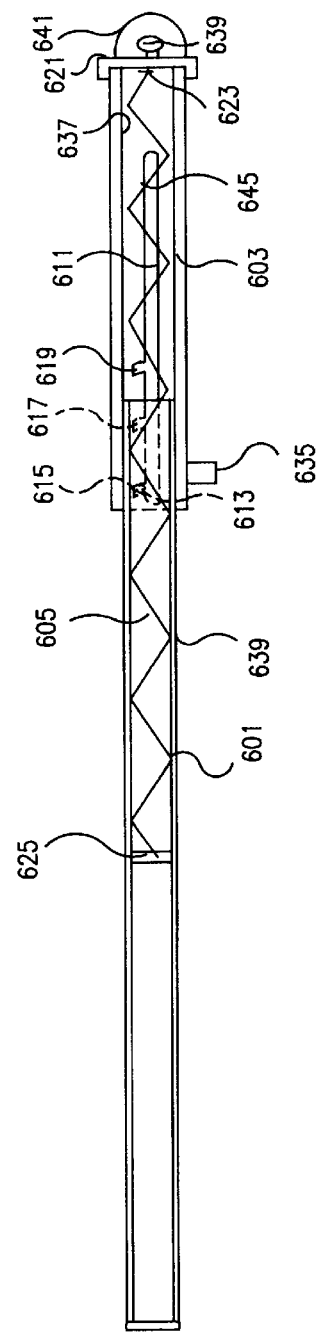

RETRACTABLE FOOT PEG FOR SELF PROPELLED, MULTIWHEELED VEHICLES

BACKGROUND OF THE INVENTION

1. Field of the Invention

This invention relates to self propelled, multiwheeled vehicles. In its aspects it relates to accessories for multiwheeled vehicles. In one of its aspects, it relates to increasing the comfort level of riding a self propelled, multiwheeled vehicle. In another of its aspects, it relates to increasing the safety of riding a self propelled, multiwheeled vehicle. More particularly it relates to providing a foot rest for either the operator position or the passenger position of a multiwheeled vehicle. In a more particular aspect, the invention relates to telescoping foot rests for self propelled, multiwheeled vehicles and, most particularly, relates to self-retracting, telescoping foot rests for self propelled, two wheeled vehicles.

2. Description of the Prior Art

Most self-propelled, multiwheeled vehicles, such as motorcycles and motorbikes, are now built to accommodate not only an operator of the vehicle but also a passenger who rides on a seating area behind the operator. In both the operator and passenger positions the comfort of the rider can be enhanced by providing a foot rest, commonly called a foot peg, allowing the legs of the rider to be in a position that is more stretched out and thereby more comfortable than the bent knee position most commonly required by the pedal-type foot rests built into most motorized cycles.

A major problem with foot pegs that are added to the profile of one of these vehicles has been the length of the protrusion of the foot pegs from the sides of the vehicle. The foot pegs can become more and more hazardous to a rider, to the vehicle itself and to objects beside the vehicle as the length of the extension is increased unless provision is made to limit the extension of the foot pegs when not in service. This problem has been solved variously by providing folding foot pegs or foot pegs that can be expanded from a telescoped position to an extended position.

U.S. Pat. No. 3,794,353 is typical of road vehicle foot rests shown in the patented art that provide a bar with fold-up portions at its extremities. The bar can be attached to the frame of the vehicle so that the fold-up portions in the extended position provide a foot rest and in the folded position lie against the side of the vehicle. This addresses the problem of shortening the extended foot rest both when in service and when not in service.

U.S. Pat. No. 4,797,791 is another example of a foot peg with a fold-up portion. This foot peg, however, discloses the added benefit of the inclusion of a light at the outer end of the foot peg. The light serves as a safety device by delimiting the width of the vehicle for approaching vehicles.

U.S. Pat. No. 5,524,918 discloses a motorcycle with a footrest for a passenger. This footrest is attached to a portion of the motorcycle to provide relief from the danger of the passenger's legs contacting the hot exhaust pipes of the motorcycle. The footrest is designed, on being screwably released from the telescoped position, to automatically extend by spring action to an increased length. The footrest can be compressed back to its telescoped, i.e. non-extended, length and resecured in that position by a screw mechanism.

As set out above, the prior art discloses extendable foot rests, including lighted foot rests, for self propelled, two wheeled vehicles. U.S. Pat. No. 5,524,918 seems to be unique in its disclosure of a spring-loaded, automatically, extendable foot peg. The terminology "automatically, extendable" describes the fact that the spring loading of the foot peg disclosed in U.S. Pat. No. 5,524,918 automatically extends the foot peg which must be manually, retracted by telescoping the elements of the foot peg and then securing the foot peg in the retracted position using a screw mechanism.

Note that in the following disclosure the terms "automatically retractable" or "automatically telescopeable" are used to denote that the neutral state or state to which the inventive device should return when not in service is with the extendable portion retracted or telescoped with the support portion to shorten the device or, in other words, that, except for being secured in the service position, the device would return to the retracted state.

It is therefore an object of this invention to provide an extendable apparatus that (1) has a non-extended mode as its usual position which (2) can be secured in an extended position, but which (3) will automatically return to the non-extended position upon release from the extended position. For this disclosure the apparatus can be defined as being automatically, telescopically retractable.

It is another object of this invention to provide a device that can be attached to the body of a self propelled, vehicle having at least two wheels to provide on either or both sides of the vehicle an extendable, foot peg that is automatically, telescopically retractable.

It is a further object of this invention to provide an extendable foot peg device that is automatically, telescopically retractable that can be attached to one side of the body of a self propelled, vehicle having at least two wheels.

Another object of this invention is to provide an extendable foot peg that can be easily returned to the non-extended position while the vehicle is in service.

It is still another object of this invention to provide an extendable foot peg that is automatically, telescopically retractable that has a means for producing light attached to the portion of the foot peg that can be extended.

These and other objects and advantages of the present invention will become evident to those skilled in the art by reference to the following description and drawings and the appended claims.

TERMS USED IN DESCRIPTION OF THE INVENTION

For the purposes of discussing this invention the parts of the apparatus that slidably interact with each other will be called slidingly interacting components. A slidingly interacting component that is moved to extend the apparatus will be further denominated a sliding component. A support member is a slidingly interacting component that is fixed in position upon or within which an extension element, the sliding component, is moved to extend the apparatus.

SUMMARY OF THE INVENTION

There is provided herein an extendable apparatus suitable for attachment to a multiwheeled, self propelled vehicle to provide a foot rest on either or both sides of the vehicle. The extendable apparatus incorporates a support element and at least one extension element retained in slidable, telescoping alignment with the support element by a tension member.

In a non-functioning condition the at least one extension element is held telescoped with a support element in a nonextended position by the tension member. To attain the functioning condition the extension element is slid along the support element stretching the tension member and extending the length of the apparatus. The extension element is held in a desired, extended position by a locking mechanism. Upon releasing the locking mechanism the tension member returns the extension element to the non-extended position.

The invention provides for attaching the extendable apparatus to the frame or body of the wheeled vehicle by either an associated, independent attachment means or using an attachment means that is affixed to the support element as part of the extendable apparatus. Ideally, in the retracted position the apparatus extends a minimal distance from the side of the vehicle, i.e. the width of the vehicle at least partially conceals the apparatus unless it is extended.

This invention also provides means for affixing means for producing light to an extension element of the extendable apparatus.

BRIEF DESCRIPTION OF THE DRAWING

FIG. 1 shows an extendable apparatus in which two extension elements are housed within a support member.

FIG. 2 shows an extendable apparatus in which an extension element is housed within a support member.

FIG. 3 shows an extendable apparatus in which two extension elements are supported on a support member with each extension element having a slot pin that is slidingly engaged within a slot on the support member and a means for attaching the extendable apparatus.

FIG. 4 shows an extendable apparatus in which two extension elements are supported on a support member with each extension element having a slot that is slidingly engaged by slot pins on the support member and a means for attaching the extendable apparatus.

FIG. 5 shows an extendable apparatus in which a single extension element is supported on a support member with the extension element having a slot pin that is slidingly engaged within a slot on the support member.

FIG. 6 shows an extendable apparatus with illumination means on the extendable end and the single extension element is supported on a support member with the extension element having a slot that is slidingly engaged by a slot pin on the support member.

In the drawing like parts have been given like numbers.

DETAILED DESCRIPTION OF THE INVENTION

Figure 7:
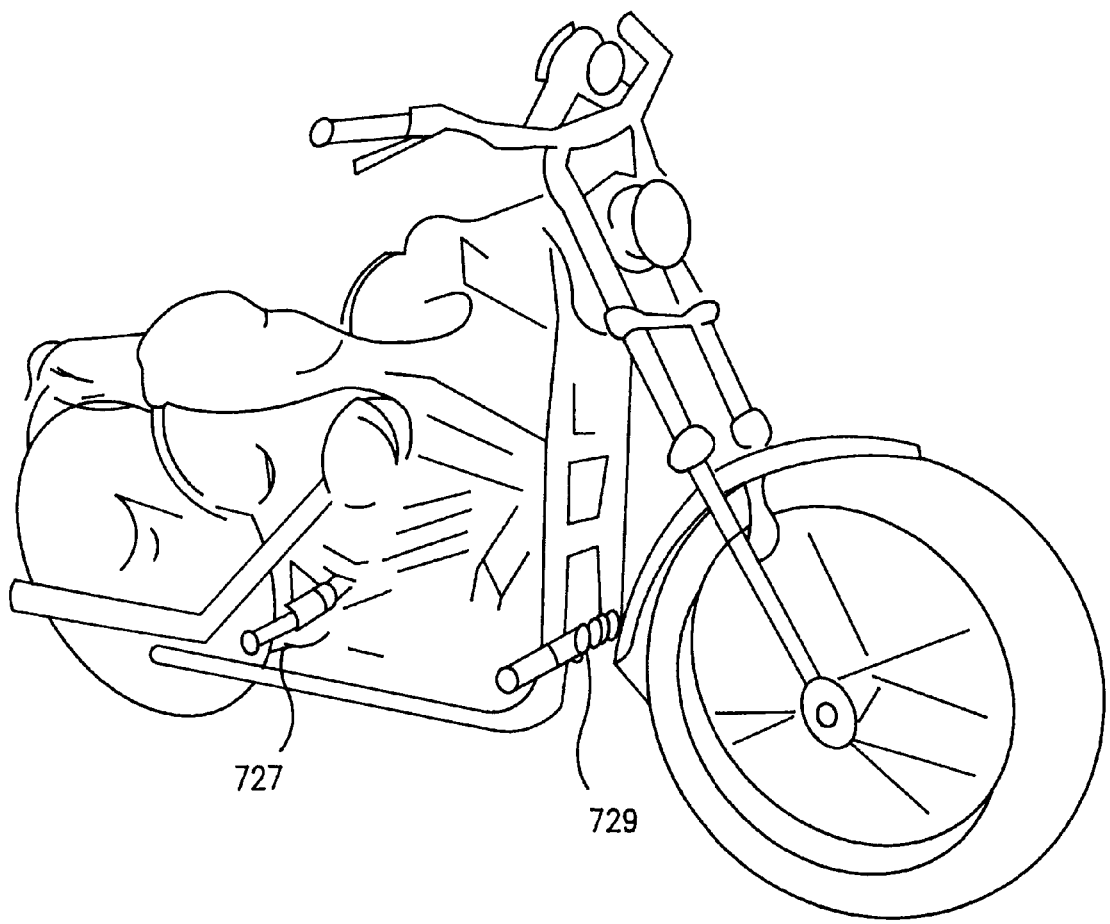
FIG. 7 shows a motorcycle with attachment for an apparatus of FIG. 1, 3 or 4 to the frame and attachment for an apparatus of FIG. 2, 5 or 6 to the body of the vehicle.

According to this invention there is provided an extendable apparatus that incorporates (A) a support member slidably retaining (B) at least one extension element which is biased by (C) a tensioning means to remain in a retracted position and (D) means for securing the at least one extension element in a position in which the overall length of the apparatus is extended.

Referring to the drawing, FIG. 1 shows that in the most preferred embodiment of this invention the support member is represented as a tubular housing within which the at least one extension element slides while FIGS. 3 and 4 depict another preferred embodiment in which the at least one extension element is represented as a tubular housing for the support member and slides on the support member. In these embodiments of the invention one of the slidingly interacting components is fixed in position while the sliding component provides the extension of the apparatus. In FIG. 1 an inner sliding component is moved to extend the apparatus by sliding within the outer slidingly interacting component which is held in a fixed position. In FIGS. 3 and 4 an outer sliding component is moved to extend the apparatus by sliding on the outside of the inner slidingly interacting component which is held in a fixed position.

Referring now to FIG. 1, the outer slidingly interacting component is preferably a cylindrical tube which acts as a support tube 101. The support tube has slidingly engaged within it two cylindrical tubes which are the extension elements 103a,103b. An extension element in the retracted position extends within the support tube from an end of the support tube to a position sufficiently less than half of the length of the support tube so that room within the support tube is provided for operable connection of one end of a tensioning means 105a,105b. Each of the extension elements has an outer wall 107a,107b that slidingly engages the inner wall 109a,109b of the support tube.

The support tube has a slot 111 extending in a straight line parallel to the center line of the cylindrical tube. The slot slidingly accommodates a slot pin 113a,113b fixedly attached to an extension element. The location of the slot pin on an extension element and the location of the end of the slot in relation to the end of the support tube are coordinated so that in the extended position there is ample length of the extension element remaining within the support tube to assure support of the extension element. At the end of the slot 111 is an offset slot 115a,115b that is sufficiently angled or in the form of a "J" to provide retention of the slot pin thereby retaining the extended position of the extension element against the influence of the stretched tensioning means. Additional offset slots 117a,117b,119a,119b can also be provided along the length of the slot to allow retention of the extension element with less than full extension of the foot peg.

The extension element has fixedly attached to its outer wall 107a,107b a slot pin 113a,113b that extends into and slidably engages the slot 111 in the support tube 101. The slot pin can be affixed to the extension element by any convenient means that does not interfere with the sliding relationship of the support tube and the extension element or, when the extension element is a tube, that does not interfere with a tensioning means 105a,105b extending through the tube. The slot pin is preferably tapped into the extension element or inserted into a hole in the extension element and brazed. When installed, the slot pin extends from the extension element sufficiently into the slot in the support tube to provide locking contact when moved into the offset in the extended position. The slot pin can be extended through the slot in the support tube and past the outer wall of the support tube for a distance sufficient to allow it to be moved by foot contact, but, preferably, adjustment of the length of the foot peg is done with the hand.

The end of the extension element outside of the support tube is capped. The cap 121a,121b is preferably at least the same diameter as the outside diameter of the support tube. This allows the cap to act as a stop to prevent the extension element from being drawn into the support tube. In an embodiment of the invention in which the extension element can be moved by foot there is, however, no reason except aesthetics that the end of the retracted extension element should not be within the support tube. The cap can be, among others, a disc that is welded, press fitted or pinned to the end of the extension element or can be a cap with internal threads that mate with threads on the outside surface of the extension element.

The extension element also has as a component a means for attachment 123a,123b of the extension element end of the tensioning means. Among the preferred means of attachment are an eye, a tee, or other similar means affixed to the inner end of a solid extension element or the inside surface of a cap on a tubular extension element or a pin passed through a diameter of a tubular extension element but not extending past the outside surface of the extension element to interfere with the sliding engagement of the support tube.

The support tube end 125a,125b of the tensioning means can be attached to the support tube. Among the preferred means of attachment are a hole through the support tube providing a surface over which the end of the tensioning means can be hooked and a pin passed through a diameter of the support tube around which the end of the tensioning means can be fastened. In the embodiment of the invention which has two extension elements housed within a support tube, one end of the tensioning means can be attached to one of the extension elements and the other end to the other extension element.

The tensioning means 105a,105b can be any known, resilient means that when stretched provides stress to retract to its original shape and which is made of durable material that retains its resilience. Preferred for this invention are metal, tension springs. The spring must have the ability to be repetitiously stretched without difficulty to lock the extension element in the extended position and have sufficient elasticity to return the extension element to its retracted position and hold it there. The spring should hold the extension element in its retracted position with sufficient force to prevent rattling of the extension element against the support tube.

To be operable, the retractable foot peg of this invention must be fixed onto a multiwheeled vehicle. The foot peg can be constructed with the means for installation as a part of the apparatus such as welding attachment brackets 727 to the support tube. These attachment brackets can have holes through which bolts can be passed for attachment to a vehicle or the brackets can be welded directly to the vehicle frame or body. The foot peg can also be attached to the vehicle using "U" bolts 729 or other external means of attachment such as customized brackets affixed to the vehicle frame or customized with extension rods attached to the support tube which are then attached to the vehicle frame with "U" bolts.

In the embodiment of this invention having two extension elements in a support tube, the support tube protects the movement of the extension elements contained therein so that the placement of the attachment means is not constrained by possible interference of the operating parts except the slot pins which must be positioned for convenient, unimpeded access when designed to be moved by a foot.

For hand operation the support tube can be installed with the slot in any position relative to the operator of the vehicle. Even in an embodiment in which the slot pin is designed to be operated with some part of the foot, it is a matter of convenience for the individual operator whether the slot be on the top, the bottom or any position in between on the front of the support tube. For this purpose one of the most convenient means of attachment is a pair of clamp means fixedly attached to the frame of the vehicle which allows the support tube to be turned within the clamps to a desired position with the clamps then being tightened to hold that position.

This embodiment of the invention is designed principally to be operably attached to a motor driven, two-wheeled vehicle such as a motorcycle in a position behind the front wheel and on the front of the frame between the handlebars and the driver. To extend the foot peg an extension element 103a,103b is pulled by hand by the cap end or by the slot pin 113a,113b until the slot pin is moved into the offset notch by a twist of the wrist. To release the extension element the slot pin is moved out of the offset notch with a pull and twist of the wrist and the tensioning means 105a,105b retracts the extension element to the non-extended position.

In the embodiments having an extended slot pin, the slot pin 113a,113b is moved with a foot from the retracted position (shown as side a of FIG. 1) along the slot 111 to the offset slot 115a,115b and with a foot movement perpendicular to the slot the slot pin is moved into the offset slot where the resilience of the tensioning means 105a,105b holds the slot pin in the extended position (shown as side b of FIG. 1). To release the slot pin the foot is moved against the slot pin in a movement counter to the locking movement i.e. perpendicular to the slot in a direction opposite to the locking movement and at the same time away from the vehicle. The slot pin on being moved out of the offset slot returns, by the action of the tensioning means, to the retracted position.

Referring now to FIG. 2, in another embodiment of this invention an apparatus is provided that is suitable for installation for extension on only one side of the body of a vehicle. This embodiment can be understood as the adaptation of one end of the apparatus of the embodiment of FIG. 1 to be attached to a vehicle so that installation can be made to accommodate the operator or a rider on a vehicle when a foot peg is desired on only one side of the vehicle or at two different levels on opposite sides of the vehicle.

The cylindrical, support tube 201 has slidingly engaged within it a single cylindrical tube which is the extension element 203. The support tube in this embodiment, for the best support of the apparatus against the thrust of the foot in extended position, should be about the same length as the full-length support tube as shown in FIG. 1 and should have the same arrangements for attachment as that full length support tube.

An extension element in the retracted position extends within the support tube from an end of the support tube to a position sufficiently less than the length of the support tube so that room is left within the support tube for operable connection of one end of a tensioning means 205. The extension element has an outer wall 207 that slidingly engages the inner wall 209 of the support tube.

The support tube has a slot 211 extending in a straight line parallel to the center line of the cylindrical tube. The slot slidingly accommodates a slot pin 213 fixedly attached to an extension element. The slot can extend to the attachment end 231 of the support tube but can be terminated at a distance from the attachment end that allows operable access to a slot pin. The location of the slot pin 213 on the extension element and the location of the extension end 233 of the slot 211 in relation to the end of the support tube is coordinated so that in the extended position there is ample length of the extension element remaining within the support tube to assure support of the extension element. At the extension end of the slot 211 is an offset slot 215 that can be sufficiently angled or in the form of a "J" to provide retention of the slot pin thereby retaining the extended position of the extension element against the influence of the stretched tensioning means. Additional offset slots 217,219 can also be provided along the length of the slot to allow retention of the extension element with less than full extension of the foot peg.

As in the embodiment discussed above, the extension element 203 has fixedly attached to its outer wall 207 a slot pin 213 which extends sufficiently into the slot 211 in the support tube 201 to provide slidable engagement. The slot pin can be affixed to the extension element by any convenient means that does not interfere with the sliding relation of the support tube and the extension element or, when the extension element is a tube, that does not interfere with a tensioning means 205 extending through the tube. The slot pin is preferably tapped into the extension element or inserted into a hole in the extension element and brazed. When installed, the slot pin can extend from the extension element through the slot in the support tube and past the outer wall of the support tube for a distance sufficient to allow it to be moved by foot contact.

The end of the extension element outside of the support tube is capped. The cap 221 is preferably at least the same diameter as the outside diameter of the support tube. This allows the cap to act as a stop to prevent the extension element from being drawn into the support tube. The cap can be, among others, a disc that is welded, press fitted or pinned to the end of the extension element or can be a cap with internal threads that mate with threads on the outside surface of the extension element.

The extension element also has as a component a means for attachment 223 of the extension element end of the tensioning means. Among the preferred means of attachment are an eye, a tee, or other similar means affixed to the inner end of a solid extension element or the inside surface of a cap on a tubular extension element or a pin passed through a diameter of a tubular extension element but not extending past the outside surface of the extension element to interfere with the sliding engagement of the support tube.

The support tube end 231 of the tensioning means can be attached to the support tube. Among the preferred means of attachment are a hole through the support tube providing a surface over which the end of the tensioning means can be hooked and a pin passed through a diameter of the support tube around which the end of the tensioning means can be fastened.

The attachment end 231 of the support tube is preferably closed with a welded covering or it can be closed with means similar to the closure for the extension means. An eye, a tee, or other similar means of attachment for the tensioning means can be affixed to the inside of the enclosing cover, but preferably the tensioning means is attached to a pin 225 passed through a diameter of the support tube at the center of the support tube around which the end of the tensioning means can be fastened. Suitable tensioning means 205 have been described above.

To be operable, the retractable foot peg of this invention must be fixed onto a multiwheeled vehicle. The foot peg can be constructed with the means for installation as a part of the apparatus such as welding attachment brackets 227 to the support tube. These attachment brackets can have holes through which bolts can be passed for attachment to a vehicle or the brackets can be welded directly to the vehicle frame or body.

This embodiment of the foot peg (see FIG. 7) can also be attached to the vehicle using "U" bolts 729 or other external means of attachment such as customized brackets affixed to the vehicle frame 727. The attachment end portion of the support tube is of sufficient length to provide the area for attachment required by a "U" bolt or customized brackets. In this embodiment the attachment end 231 of the support tube can be capped by, among others, a disc that is welded, press fitted or pinned to the end of the extension element, a disc that has on its circumferential surface threads that mate with threads on the inner surface of extension element or a cap having a greater diameter than the extension element and having internal threads that mate with threads on the outside surface of the extension element thereby providing a location suitable for installing means to attach tensioning means.

The support tube can be installed with the slot in any position relative to the operator or a rider of the vehicle. Since the slot pin can be designed to be operated with some part of the foot, it is a matter of convenience for the individual operator whether the slot be on the top, the bottom any position in between on the front of the support tube.

This embodiment of the invention is designed principally to be operably attached to a motor driven, two-wheeled vehicle such as a motorcycle in a position behind the operator of the vehicle but can also be placed in a position forward of the operator of the vehicle. A preferred means of attachment has brackets 227 welded to the support element 201 at least at two positions to provide support against the force of a foot pushing against the extended end of the apparatus. The brackets can be attached to the frame of the vehicle by welding the brackets to the frame or by attaching U-bolts to the frame through holes 229 provided in the brackets.

In operation, the slot pin 213 is moved by hand or, where appropriate, by foot from the retracted position along the slot 215 to the offset slot 217 and with a movement perpendicular to the slot the slot pin is moved into the offset slot where the resilience of the tensioning means 205 holds the slot pin in position. To release the slot pin the slot pin 213 is moved counter to the locking movement i.e. perpendicular to the slot in a direction opposite to the locking movement and at the same time away from the vehicle. The slot pin on being moved out of the offset slot returns, by the action of the tensioning means 205, to the retracted position.

Referring now to FIG. 3, the inner slidingly interacting component is preferably a cylindrical tube which acts as a support tube 301. The support tube has slidingly engaged upon it two cylindrical tubes which are the extension elements 303a,303b. An extension element in the retracted position extends on the outside of the support tube from an end of the support tube to a position sufficiently less than half of the length of the support tube so that room is left at the center of the support tube for operable connection of one end of a tensioning means 305a,305b and for operable connection of vehicle attachment means 327,329 without interfering with the movement of an extension element. Each of the extension elements has an inner wall 337a,337b that slidingly engages the outer wall 339a,339b of the support tube.

The support tube has a slot 311 extending in a straight line parallel to the center line of the cylindrical support tube. The slot slidingly accommodates a slot pin 313a,313b fixedly attached to an extension element. The location of the slot pin on an extension element and the location of the end of the slot in relation to the end of the support tube are coordinated so that in the extended position there is ample length of the support tube remaining within the extension element to assure support of the extension element. At the end of the slot 311 is an offset slot 315a,315b that is angled or in the form of a "J" to provide retention of the slot pin thereby retaining the extended position of the extension element against the influence of the stretched tensioning means. Additional offset slots 317a,317b,319a,319b can also be provided along the length of the slot to allow retention of the extension element with less than full extension of the foot peg.

The extension element has fixedly attached to its inner wall 337a,337b a slot pin 313a,313b that extends through and slidably engages the slot 311 in the support tube 301. The slot pin can be affixed to the extension element by any convenient means that does not interfere with the sliding relation of the support tube and the extension element or that does not interfere with a tensioning means extending through the tube. The slot pin is preferably tapped into the extension element or inserted into a hole in the extension element and brazed. When installed, the slot pin extends from the extension element through the slot in the support tube but is not of sufficient length to interfere with a tensioning means extending through the tube.

For movement using a foot, this embodiment requires either (a) that the slot pin extend through the extension element and for a distance therefrom sufficient to allow it to be moved by foot contact or (b) that a second pin 335a,335b be set in the outer wall of the extension element in a position that allows easy foot access to the pin. The second pin can be affixed to the extension element by any convenient means that does not interfere with the sliding relation of the support tube and the extension element. The second pin extends from the outer wall of the extension element for a distance sufficient to allow it to be moved by foot contact.

The outside end of the extension element is capped. The cap 321a,321b both acts as a stop for the retraction of the extension element and provides a location for the attachment of a tensioning means. The cap can be, among others, a disc that is welded, press fitted or pinned to the end of the extension element, a disc that has on its circumferential surface threads that mate with threads on the inner surface of extension element or a cap having a greater diameter than the extension element and having internal threads that mate with threads on the outside surface of the extension element.

The extension element also has as a component a means for attachment 323a,323b of the extension element end of the tensioning means. Among the preferred means of attachment are an eye, a tee, or other similar means affixed to the inside surface of a cap on a tubular extension element.

The tensioning means of this embodiment of the invention are essentially the same as for the apparatus set out in FIG. 1. The support tube end 325a,325b of the tensioning means is attached to the support tube. Among the preferred means of attachment for a tubular support tube are a hole through the support tube providing a surface over which the end of the tensioning means can be hooked and a pin passed through a diameter of the support tube around which the end of the tensioning means can be fastened. In the embodiment of the invention which has two extension elements housed within a support tube one end of the tensioning means can be attached to one of the extension elements and the other end to the other extension element. When the support tube is a solid cylinder among the preferred means of attachment are an eye, a tee, or other similar means affixed to the circular surface of end of the cylinder within the extension element.

This embodiment of the invention can be attached to the frame of a vehicle at any position suitable for use of an apparatus set out in FIG. 1. In operation the slot pin is moved in the same manner as set out above for the apparatus of FIG. 1. When the apparatus is supplied with a second slot pin, the orientation of the second slot pin in relation to the first slot pin is such as to provide exactly the same positioning of the first slot pin in the slot in the support tube resulting from the movement of the second pin as would be obtained by direct movement of the first pin as in the operation of the apparatus of FIG. 1.

Attachment of this embodiment of the invention to a vehicle requires care that the attachment is made so that sufficient distance is provided between the frame of the vehicle and the extendable apparatus that the extension and retraction of the apparatus are not hindered. Most preferably, the center portion of the support tube is fixedly attached to an attachment means 327 that has a portion 331 extending along the vehicle frame parallel to the extendable apparatus from the center of which extends a means for clasping the extendable apparatus in a tee shaped device 329 similar to those commonly used to secure handlebars on bicycles. The holding tee is extended an operable distance from the vehicle frame and is provided with means for solidly clasping the extendable apparatus 329 or for pinning the extendable apparatus in operable position 333. The portion 331 can be welded to the vehicle frame or can be perforated with holes 341 suitable for retaining U-bolts. For this embodiment both the attachment means and the support tube must be made of sturdy stock to withstand the operational torsion in the area of attachment when feet are pushing on opposite ends of the extendable apparatus.

Referring now to FIG. 4, the inner slidingly interacting component is preferably a cylindrical tube which acts as a support tube 401. The support tube has slidingly engaged upon it two cylindrical tubes which are the extension elements 403a,403b. An extension element in the retracted position extends on the outside of the support tube from an end of the support tube to a position sufficiently less than half of the length of the support tube so that room is left at the center of the support tube for operable connection of one end of a tensioning means 405a,405b and for operable connection of attachment means without interfering with the movement of an extension element. The extension element has an inner wall 437a, 437b that slidingly engages the outer wall 439a,439b of the support tube.

The extension element has a slot 411a,411b extending in a straight line parallel to the center line of the cylindrical support tube. The slot slidingly accommodates a slot pin 413a,413b fixedly attached to the support tube. The location of the slot pin on the support tube is designated so that in the extended position there is ample length of the support tube remaining within the extension element to assure support of the extension element. At the end of the slot 411a,411b nearest the center of the apparatus is an offset slot 415a,415b that is angled or in the form of a "J" to provide retention of the slot pin thereby retaining the extended position of the extension element against the influence of the stretched tensioning means. Additional offset slots 417,419 can also be provided along the length of the slot to allow retention of the extension element with less than full extension of the foot peg.

The support tube has fixedly attached to its outer wall 437a,437b a slot pin 413a,413b that extends through and slidably engages the slot 411a,411b in the extension element 403a,403b. The slot pin can be affixed to the support tube by any convenient means that does not interfere with the sliding relation of the support tube and the extension element. The slot pin is preferably tapped into the support tube or inserted into a hole in the support tube and brazed. When installed, the slot pin extends from the support tube through the slot in the support tube but preferably does not extend past the outside wall of the extension element.

For operation with a portion of the foot this embodiment requires that a second pin 435a,435b be set in the outer wall of the extension element in a position that allows easy foot access to the pin and that does not interfere with the slot. The second pin can be affixed to the extension element by any convenient means that does not interfere with the sliding relation of the support tube and the extension element. The second pin extends from the outer wall 441a,441b of the extension element for a distance sufficient to allow it to be moved by foot contact.

As with the embodiment illustrated in FIG. 1, the outside end of the extension element is capped. The cap 421a,421b both acts as a stop for the retraction of the extension element and provides a location for the attachment of a tensioning means. The cap can be, among others, a disc that is welded, pressfitted or pinned to the end of the extension element, a disc that has on its circumferential surface threads that mate with threads on the inner surface of extension element or a cap having a greater diameter than the extension element and having internal threads that mate with threads on the outside surface of the extension element.

The extension element also has as a component a means for attachment 423a,423b of the extension element end of the tensioning means. Among the preferred means of attachment are an eye, a tee, or other similar means affixed to the inside surface of a cap on a tubular extension element.

The support tube end 425a,425b of the tensioning means can be attached to the support tube. Among the preferred means of attachment are a hole through the support tube providing a surface over which the end of the tensioning means can be hooked and a pin passed through a diameter of the support tube around which the end of the tensioning means can be fastened. In the embodiment of the invention which has two extension elements housed within a support tube one end of the tensioning means can be attached to one of the extension elements and the other end to the other extension element. When the support tube is a solid cylinder among the preferred means of attachment are an eye, a tee, or other similar means affixed to the circular surface of end of the cylinder within the extension element.

The tensioning means and the attachment to a vehicle of this embodiment of the invention are essentially the same as for the apparatus set out in FIG. 3. This embodiment of the invention can be attached to the frame of a vehicle at any position suitable for use of an apparatus set out in FIG. 3 by securing the attachment means 427 to the support means by welding or pinning and securing the attachment means to the frame by welding or using U-bolts inserted through holes 443 in the attachment means. In operation the second slot pin is moved in the same manner as set out above for the apparatus of FIG. 3. The orientation of the second slot pin in relation to the first slot pin is such as to provide exactly the same positioning of the first slot pin in the slot in the extension element resulting from the movement of the second pin as would be obtained by direct movement of the first pin as in the operation of the apparatus of FIG. 3.

Referring now to FIGS. 5 and 6, in these embodiments of this invention apparatuses are provided that are suitable for installation on either side of the body of a vehicle. These embodiments can be understood as the adaptation of apparatus of the embodiments of FIGS. 3 and 4 to be attached to a vehicle principally so that a rider can be afforded use of a foot peg or that installation can be made to accommodate the operator of a vehicle when it is not practical to attach an apparatus having two extension elements with a single support member to the frame of the vehicle. The embodiments of FIGS. 5 and 6 can be considered as removing an extension element from the apparatuses set out in FIGS. 3 and 4 and providing means to attach the resulting apparatus to opposite sides of a vehicle. The descriptions of the embodiments set out in FIGS. 5 and 6 are, for the most part, a repetition of the descriptions of the embodiments set out in FIGS. 3 and 4, but are set out here for the sake of clarity.

Referring now to FIG. 5, the inner slidingly interacting component is preferably a cylindrical tube which acts as a support tube 501. The support tube has slidingly engaged upon it a cylindrical tube which is the extension element 503. The extension element in the retracted position extends on the outside of the support tube from an end of the support tube to a position sufficiently less than half of the length of the support tube so that room is left at the attachment end of the support tube for operable connection of one end of a tensioning means 505 and for operable connection of vehicle attachment means 527,529 without interfering with the movement of an extension element. Each of the extension elements has an inner wall 537 that slidingly engages the outer wall 539 of the support tube.

The support tube has a slot 511 extending in a straight line parallel to the center line of the cylindrical support tube. The slot slidingly accommodates a slot pin 513 fixedly attached to an extension element. The location of the slot pin on an extension element and the location of the end of the slot in relation to the end of the support tube are coordinated so that in the extended position there is ample length of the support tube remaining within the extension element to assure support of the extension element. At the end of the slot 511 is an offset slot 515 that is angled or in the form of a "J" to provide retention of the slot pin thereby retaining the extended position of the extension element against the influence of the stretched tensioning means. Additional offset slots 517,519 can also be provided along the length of the slot to allow retention of the extension element with less than full extension of the foot peg.

The extension element has fixedly attached to its inner wall 537 a slot pin 513 that extends through and slidably engages the slot 511 in the support tube 501. The slot pin can be affixed to the extension element by any convenient means that does not interfere with the sliding relation of the support tube and the extension element or that does not interfere with a tensioning means extending through the tube. The slot pin is preferably tapped into the extension element or inserted into a hole in the extension element and brazed. When installed, the slot pin extends from the extension element through the slot in the support tube but is not of sufficient length to interfere with a tensioning means extending through the tube.

This embodiment requires either (a) that the slot pin extend through the extension element and for a distance therefrom sufficient to allow it to be moved by foot contact or (b) that a second pin 535 be set in the outer wall of the extension element in a position that allows easy foot access to the pin. The second pin can be affixed to the extension element by any convenient means that does not interfere with the sliding relation of the support tube and the extension element. The second pin extends from the outer wall of the extension element for a distance sufficient to allow it to be moved by foot contact.

The outside end of the extension element is capped. The cap 521 both acts as a stop for the retraction of the extension element and provides a location for the attachment of a tensioning means. The cap can be, among others, a disc that is welded, press fitted or pinned to the end of the extension element, a disc that has on its circumferential surface threads that mate with threads on the inner surface of extension element or a cap having a greater diameter than the extension element and having internal threads that mate with threads on the outside surface of the extension element.

The extension element also has as a component a means for attachment 523 of the extension element end of the tensioning means. Among the preferred means of attachment are an eye, a tee, or other similar means affixed to the inside surface of a cap on a tubular extension element.

The support tube end 525 of the tensioning means is attached to the support tube. Among the preferred means of attachment for a tubular support tube are a hole through the support tube providing a surface over which the end of the tensioning means can be hooked and a pin passed through a diameter of the support tube around which the end of the tensioning means can be fastened. In the embodiment of the invention which has two extension elements housed within a support tube one end of the tensioning means can be attached to one of the extension elements and the other end to the other extension element. When the support tube is a solid cylinder, among the preferred means of attachment are an eye, a tee, or other similar means affixed to the circular surface of end of the cylinder within the extension element.

The tensioning means and the attachment of this embodiment of the invention to a vehicle are essentially the same as for the apparatus set out in FIG. 2.

Referring to FIG. 6, the support member 601 has slidingly engaged upon it a single cylindrical tube which is the extension element 603. An extension element in the retracted position extends on the support tube from an end of the support tube to a position sufficiently less than the length of the support tube so that room is left within or on the support tube for operable connection of one end of a tensioning means 605. The extension element has an inner wall 637 that slidingly engages the outer wall 639 of the support tube.

The extension element has a slot 611 extending in a straight line parallel to the center line of the cylindrical support tube. The slot slidingly accommodates a slot pin 613 fixedly attached to the support tube. The location of the slot pin on the support tube is designated so that in the extended position there is ample length of the support tube remaining within the extension element to assure support of the extension element. At the end of the slot 611 nearest the attachment end of the apparatus is an offset slot 615 that is angled or in the form of a "J" to provide retention of the slot pin thereby retaining the extended position of the extension element against the influence of the stretched tensioning means. Additional offset slots 617,619 can also be provided along the length of the slot to allow retention of the extension element with less than full extension of the foot peg.

The support tube has fixedly attached to its outer wall 639 a slot pin 613 that extends through and slidably engages the slot 611 in the extension element 601. The slot pin can be affixed to the support tube by any convenient means that does not interfere with the sliding relation of the support tube and the extension element. The slot pin is preferably tapped into the support tube or inserted into a hole in the support tube and brazed. When installed, the slot pin extends from the support tube through the slot in the support tube but preferably does not extend past the outside wall of the extension element.

This embodiment requires that a second pin be set in the outer wall of the extension element in a position that allows easy foot access to the pin and that does not interfere with the slot. The second pin can be affixed to the extension element by any convenient means that does not interfere with the sliding relation of the support tube and the extension element. The second pin extends from the outer wall of the extension element for a distance sufficient to allow it to be moved by foot contact.

The outside end of the extension element is capped. The cap 621 both acts as a stop for the retraction of the extension element and provides a location for the attachment of a tensioning means. The cap can be, among others, a disc that is welded, press fitted or pinned to the end of the extension element, a disc that has on its circumferential surface threads that mate with threads on the inner surface of extension element or a cap having a greater diameter than the extension element and having internal threads that mate with threads on the outside surface of the extension element.

The extension element also has as a component a means for attachment 623 of the extension element end of the tensioning means. Among the preferred means of attachment are an eye, a tee, or other similar means affixed to the inside surface of a cap on a tubular extension element.

The support tube end 625 of the tensioning means can be attached to the support tube. Among the preferred means of attachment are a hole through the support tube providing a surface over which the end of the tensioning means can be hooked and a pin passed through a diameter of the support tube around which the end of the tensioning means can be fastened. When the support tube is a solid cylinder among the preferred means of attachment are an eye, a tee, or other similar means affixed to the circular surface of the end of the cylinder within the extension element.

To be operable, the retractable foot peg of the embodiments of this invention set out in FIGS. 5 and 6 must be fixed onto a multiwheeled vehicle. The foot peg can be constructed with the means for installation as a part of the apparatus such as welding attachment brackets to the support tube, preferably covering the attachment end of the support tube. These attachment brackets can have holes through which bolts can be passed for attachment to a vehicle or the brackets can be welded directly to the vehicle frame or body.

These embodiments, 5 and 6, can also be attached to the vehicle using "U" bolts or other external means of attachment such as customized brackets affixed to the vehicle frame, provided the attachment end portion of the support tube is of sufficient length to provide the area for attachment required by a "U" bolt or customized bracket. For this use the attachment end of the support tube can be capped by, among others, a disc that is welded, press fitted or pinned to the end of the extension element, a disc that has on its circumferential surface threads that mate with threads on the inner surface of extension element or a cap having a greater diameter than the extension element and having internal threads that mate with threads on the outside surface of the extension element thereby providing a location suitable for installing means to attach tensioning means.

In the embodiments of 5 and 6 the support tube can be installed with the slot in any position relative to the operator or a rider of the vehicle. Since the slot pin is designed to be operated with some part of the foot, it is a matter of convenience for the individual operator whether the slot be on the top, the bottom, the front, the back or any position in between on the support tube.

Embodiments of the invention set out in FIGS. 5 and 6 are designed principally to be operably attached to a motor driven, two-wheeled vehicle such as a motorcycle in a position behind the operator of the vehicle but can also be placed in a position forward of the operator of the vehicle. In operation, the slot pin is moved with the foot from the retracted position along the slot to the offset slot and with a movement perpendicular to the slot the slot pin is moved into the offset slot where the resilience of the tensioning means holds the slot pin in position. To release the slot pin the foot is moved against the slot pin in a movement counter to the locking movement i.e. perpendicular to the slot in a direction opposite to the locking movement and at the same time away from the vehicle. The slot pin on being moved out of the offset slot returns, by the action of the tensioning means, to the retracted position.

Referring to FIG. 7, a motorcycle is shown with an apparatus of this present invention 729 attached to the frame in a position to be used by the operator of the vehicle. The apparatus is attached using "U" bolts. Similarly a single apparatus 727 is shown attached to the body of the motorcycle using a bracket welded as part of the apparatus for attachment to the vehicle. The bracket is then welded to the motorcycle body (here the rear fender).

In further embodiments of the invention, and as illustrated in FIG. 6, any of the apparatuses can be equipped with means for producing a light. The simplest means of providing light for safety or other reasons is to include a light bulb 639 with protective, transparent or translucent cover 641 as part of the cap 621 at the outside end of the extension element. Means 643 for wiring the light receptacle into the electrical system of the vehicle and the necessary "on-off" switch are well known in the art. The most acceptable means for overcoming the lengthening and shortening of the wiring as the apparatus is extended and retracted is to include the electrical wiring as a built-in part 645 of the tensioning means or, at least, to have the wiring permanently attached along the total surface of the tensioning means.

In the embodiments set out in FIGS. 1 and 4 an extension element can be solid but, for the sake of the weight of the apparatus, preferably is tubular. Similarly, in the embodiments set out in FIGS. 2, 3, 5 and 6 the support member can be at least partially solid but is preferably tubular.

It is readily apparent that for ease of obtaining construction materials that a support member and an extension element will preferably maintain slidable contact between an internal cylindrical wall of the outer component of the apparatus and an external cylindrical wall of the inner component of the apparatus and that all inner and outer, slidingly interacting components should be tubular.

The geometric configuration of the slidingly interacting surfaces of the apparatus is not, however, limited to cylindrical. The invention is operable with the slidingly interacting surface of either one of the inner or outer component having in cross-section any equilateral, multi-sided, plane geometrical configuration as long as the slidingly interacting surface of the other component is cylindrical. One cylindrical contacting surface is necessary since, in operation, one of the slidingly interacting components will be held in a fixed position while the other is rotated around the common longitudinal center line of the slidingly interacting components to secure the apparatus in the extended position by moving the slot pin from the slot into an offset slot.

If one of the contacting surfaces is not cylindrical, this non-cylindrical surface in cross-section must be a regular, equilateral, geometric figure and the locking mechanism between a support member and an extension element, i.e. the slot pin and slot, must lie in a plane of a line designated by the contact of the support member with the extension element. As the number of sides of the non-cylindrical surface is increased this surface becomes more and more like a cylindrical surface with more and more points of contact between the surfaces. Picture the configuration of the contacting surfaces as a cross-section of an equilateral triangle within a cylinder or a cylinder within an equilateral triangle. This is considered to be the least number of facets on a surface that that can be used in the invention. For an equilateral triangle within a cylinder the locking mechanism must be located on a line perpendicular to an angle of the triangle and for a cylinder within an equilateral triangle the locking mechanism must be located on a line perpendicular to a side of the triangle at the mid point of that side. Any combination of multi-sided tube with a cylindrical tube must meet the same requirements.

The outer component can have any external configuration. This configuration can match the configuration of the internal, contacting surface or, if the internal, contacting surface is cylindrical, the external surface of the outer component can have any shape that does not interfere with the movement of the components.

The apparatus of this invention can be constructed of any durable material that can be fashioned into the desired configuration and will withstand the rigors of the use to which the invention is put. Preferably the material of construction is chosen from structural plastic, metals, metal alloys and fiber glass, among others. The presently most preferred material is chosen from among stainless steels.

The invention thus being described, it will be obvious that the same may be varied in many ways. Such variations are not to be regarded as a departure from the spirit and scope of the invention and all such modifications are intended to be included within the scope of the following claims.

That which is claimed is:

1. An automatically retractable, extendable apparatus comprising:
   (A) an elongated, tubular support member;
   (B) at least one tubular, extension element slidably retained within the support member;
   (C) a tensioning means attaching the extension element to the support member and biasing the at least one extension element in a retracted position in which the apparatus is not extended and
   (D) means for extending the tensioning means and securing the at least one extension element in a position in which the apparatus and the tensioning means are extended wherein the tensioning means automatically returns the apparatus to the retracted position upon release of the securing means, wherein the means for securing the at least one extension element in a position in which the apparatus and the tensioning means are extended comprises a slot pin securely attached to and extending from the outside wall of the extension element with the pin slidably retained in a slot through the wall of the support member and accessible externally of the support member and wherein the slot comprises at least one slotted offset for retaining the slot pin thereby securing the apparatus and the tensioning means in an extended position.

2. An automatically retractable extendable apparatus of claim 1 wherein the tensioning means is a spring.

3. An automatically retractable, extendable apparatus of claim 2 wherein the extension element further comprises means for producing light.

4. An automatically retractable, extendable apparatus of claim 2 wherein there are two extension elements.

5. An automatically retractable, extendable apparatus of claim 2 wherein there is one extension element.

6. An automatically retractable, extendable apparatus of claim 2 further comprising means for attachment to a multiwheeled vehicle.

7. In combination an automatically retractable, extendable apparatus of claim 2 operably attached with means for attachment to a multiwheeled vehicle.

8. An automatically retractable, extendable apparatus of claim 6 operably attached to a multiwheeled vehicle.

9. The combination of claim 7 operably attached to a multiwheeled vehicle.

10. An automatically retractable, extendable apparatus comprising:

(A) an elongated, tubular support member;

(B) at least one tubular, extension element slidably retained on the support member;

(C) a tensioning means attaching the extension element to the support member and biasing the at least one extension element in a retracted position in which the apparatus is not extended and (D) means for extending the tensioning means and securing the at least one extension element in a position in which the apparatus and the tensioning means are extended wherein the tensioning means automatically returns the apparatus to the retracted position upon release of the securing means, wherein the means for securing the at least one extension element in a position in which the apparatus and the tensioning means are extended comprises a slot pin securely attached to and extending from the outside wall of the extension element with the pin slidably retained in a slot through the wall of the support member and accessible externally of the support member and wherein the slot comprises at least one slotted offset for retaining the slot pin thereby securing the apparatus and the tensioning means in an extended position.

11. An automatically retractable extendable apparatus of claim 10 wherein the tensioning means is a spring.

12. An automatically retractable, extendable apparatus of claim 11 wherein the extension element further comprises means for producing light.

13. An automatically retractable, extendable apparatus of claim 11 wherein there are two extension elements.

14. An automatically retractable, extendable apparatus of claim 11 wherein there is one extension element.

15. An automatically retractable, extendable apparatus of claim 7 further comprising means for attachment to a multiwheeled vehicle.

16. In combination an automatically retractable, extendable apparatus of claim 11 operably attached with means for attachment to a multiwheeled vehicle.

17. An automatically retractable, extendable apparatus of claim 15 operably attached to a multiwheeled vehicle.

18. The combination of claim 16 operably attached to a multiwheeled vehicle.

19. An extendable foot peg apparatus suitable for attachment to a self propelled, multi-wheeled vehicle, the apparatus comprising:

(A) a support tube comprising:
 (1) a slot extending in a straight line on the circumference of the support tube parallel to the center line of the support tube with the slot comprising at least one retaining, offset notch;
 (2) at least one end adapted for insertion of an extension tube;
 (3) securing means for securely attaching tensioning means in the support tube and (B) at least one extension tube slidably retained in the support tube, each extension tube comprising:
 (1) a length less than the distance from the insertion end of the support tube to the location of the securing means for attaching a tensioning means in the support tube;
 (2) a stop mechanism attached to an end of the extension tube with the stop mechanism of sufficient size to prevent the extension tube from entirely entering the support tube,
 (3) a retaining means for securely attaching a tensioning means within the extension tube and
 (4) a slot pin securely attached to and extending from the outside wall of the extension tube and slidably retained in the slot of the support tube; and (C) a tensioning means attaching the securing means in the support tube to the retaining means in each extension tube.

20. An extendable foot peg apparatus suitable for attachment to a self propelled, multi-wheeled vehicle, the apparatus comprising:

(A) a support tube comprising:
 (1) a slot extending in a straight line on the circumference of the support tube parallel to the center line of the support tube with the slot comprising at least one retaining, offset notch;
 (2) at least one end adapted for insertion into an extension tube;
 (3) securing means for securely attaching tensioning means in the support tube and (B) at least one extension tube slidably retained on the support tube, each extension tube comprising:
 (1) a length less than the distance from the insertion end of the support tube to the location of the securing means for attaching a tensioning means in the support tube;
 (2) a stop mechanism closing an end of the extension tube with the stop mechanism providing attachment for a retaining means for attaching the tensioning means in the extension tube,
 (3) the retaining means for securely attaching a tensioning means within the extension tube and
 (4) a slot pin securely attached to and extending from the inside wall of the extension tube and slidably retained in the slot of the support tube; and (C) a tensioning means attaching the securing means in the support tube to the retaining means in each extension tube.

21. An extendable foot peg apparatus suitable for attachment to a self propelled, multi-wheeled vehicle, the apparatus comprising:

(A) a support tube comprising:
 (1) at least one slot pin securely attached to and extending from the outside wall of the support tube and slidably retained in a slot of an extension tube;
 (2) at least one end adapted for insertion into an extension tube;
 (3) securing means for securely attaching tensioning means in the support tube and (B) at least one extension tube slidably retained on the support tube, each extension tube comprising:
 (1) a length less than the distance from the insertion end of the support tube to the location of the securing means for attaching a tensioning means in the support tube;
 (2) a stop mechanism closing an end of the extension tube with the stop mechanism providing attachment for a retaining means for attaching the tensioning means in the extension tube,
 (3) the retaining means for securely attaching a tensioning means within each extension tube and
 (4) a slot extending in a straight line on the circumference of each extension tube parallel to the center line of the extension tube with the slot comprising at least one retaining, offset notch; and (C) a tensioning means attaching the securing means in the support tube to the retaining means in each extension tube.

* * * * *